US008698444B2

(12) United States Patent
Malkin et al.

(10) Patent No.: US 8,698,444 B2
(45) Date of Patent: Apr. 15, 2014

(54) AIRCRAFT ELECTRICAL ACTUATOR ARRANGEMENT

(75) Inventors: Peter Malkin, Hexham (GB); David R Trainer, Derby (GB)

(73) Assignee: Rolls-Royce PLC, London (GB)

( * ) Notice: Subject to any disclaimer, the term of this patent is extended or adjusted under 35 U.S.C. 154(b) by 1054 days.

(21) Appl. No.: 12/731,642

(22) Filed: Mar. 25, 2010

(65) Prior Publication Data

US 2010/0252691 A1 Oct. 7, 2010

(30) Foreign Application Priority Data

Apr. 1, 2009 (GB) .................................. 0905560.9

(51) Int. Cl.
*H02P 8/00* (2006.01)
*H02P 7/00* (2006.01)
*B64C 17/00* (2006.01)
*F16K 31/02* (2006.01)

(52) U.S. Cl.
USPC ........... 318/696; 318/127; 318/135; 318/552; 318/671; 244/76 R; 251/129.04

(58) Field of Classification Search
USPC ........ 318/127, 135, 552, 671, 696; 244/76 R; 251/129.04
See application file for complete search history.

(56) References Cited

U.S. PATENT DOCUMENTS

| 4,079,902 | A | * | 3/1978 | Ryzhko et al. ................. 244/228 |
| 4,228,386 | A | * | 10/1980 | Griffith .......................... 318/628 |
| 4,289,996 | A | * | 9/1981 | Barnes et al. ................... 318/38 |
| 4,885,514 | A | * | 12/1989 | Novis et al. .................... 318/580 |
| 5,184,054 | A | * | 2/1993 | Delattre et al. ............... 318/586 |
| 5,204,605 | A | * | 4/1993 | Delattre et al. ............... 318/721 |
| 5,281,094 | A | * | 1/1994 | McCarty et al. .............. 416/147 |
| 5,493,497 | A | * | 2/1996 | Buus ................................ 701/4 |
| 2009/0157234 | A1 | * | 6/2009 | Breit et al. ......................... 701/3 |

FOREIGN PATENT DOCUMENTS

| EP | 1 921 741 A2 | 5/2008 |
| EP | 2 070 817 A2 | 6/2009 |

OTHER PUBLICATIONS

Dec. 4, 2009 Search Report issued in GB Application No. GB0905560.9.

* cited by examiner

*Primary Examiner* — Eduardo Colon Santana
*Assistant Examiner* — Gabriel Agared
(74) *Attorney, Agent, or Firm* — Oliff PLC

(57) ABSTRACT

An aircraft electrical actuator arrangement includes a plurality of actuators and a master power converter to convert power from the electrical power distribution network for supply to each actuator. The actuators include an environmental control system actuator, an aileron actuator, a flap actuator, a slat actuator, a landing gear actuator, a thrust reverser actuator, a brake actuator and a taxiing actuator. A controller is coupled to the master power converter and is arranged to allow the supply of power from the master power converter to the environmental control system actuator during a first mode of operation of the aircraft. The controller is arranged to allow the supply of electrical power from the master power converter to at least one of the aileron, the flap, the slat, the landing gear, the thrust reverser, the brake actuator or the taxiing actuator during a second mode of operation of the aircraft.

26 Claims, 2 Drawing Sheets

AIRCRAFT ELECTRICAL ACTUATOR ARRANGEMENT

Figure 1:
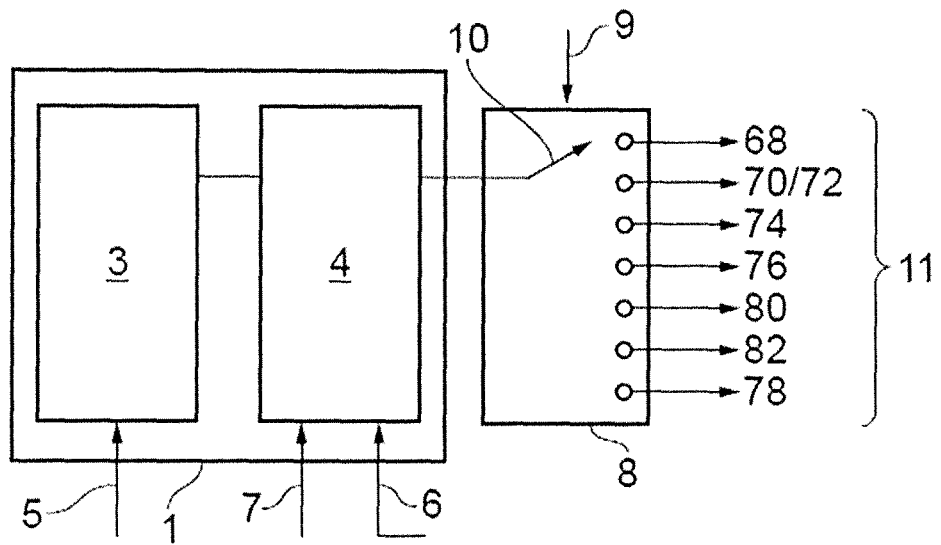

The present invention relates to an electrical actuator arrangement and more particularly to an electrical actuator arrangement utilised in a closed environment such an aircraft.

There is a desire to provide more contained electrical systems which utilise a number of electrical actuators rather than hydraulic or pneumatic devices. For example, with regard to aircraft a gas turbine engine may provide a prime mover for an electrical machine which in normal operation can act to provide electrical power to the aircraft functions whilst also acting as a starter motor for the gas turbine engine. In certain circumstances for example it may be necessary to bleed air from the engine for cabin pressurisation or environmental control but air could be taken by other means so avoiding problems with regard to contamination of the air taken from an engine. Furthermore, as indicated an engine can be started electrically rather than using compressed air to rotate the engine. Both environmental control and engine starting functions are generally provided by powered electronic motor drives which normally take power from variable frequency starter generators mounted on the gas turbine engine. Power may also be taken from external means during initial starting phases.

In the above circumstances it will be understood that power electronic converters are utilised to perform two duties, namely engine starting and environmental control. Such limited utilisation of generally different power electronic converters has significance weight implication and adds complexity as well as space accommodation problems within an aircraft.

Whilst moving towards more electric control of systems within an aircraft has benefits in terms of overall engine performance and aircraft fuel burn, it will also be appreciated that there will be significant overheads with regard to large power electronic converters and drivers to provide environmental control and other functions within the aircraft. Generally, as indicated distinct power electronics systems are provided for each actuator as there are a number of variable or temporary aircraft electrical loads. In such circumstances individual power electronic controls and power electronic converters are each distributed around an aircraft appropriately and adjacent to actuators. As indicated this increases complexity as well as cost and weight. Furthermore, such problems can create significant hurdles to further implementation of electrical solutions to necessary actuation systems within an aircraft.

In accordance with aspects of the present invention there is provided an aircraft electrical actuator arrangement comprising a plurality of electrical actuators coupled to an electrical power distribution network, the electrical power distribution network having at least one master power converter to convert electrical power from the electrical power distribution network for supply to each electrical actuator, the electrical actuators comprising at least one environmental control system actuator, at least one aileron actuator, at least one flap actuator, at least one slat actuator, at least one landing gear actuator, at least one thrust reverser actuator, at least one brake actuator and at least one taxiing actuator, a controller being coupled to the master power converter coupled, the controller being arranged to allow the supply of electrical power from the master power converter to the at least one environmental control system actuator during a first mode of operation of the aircraft, the controller being arranged to allow the supply of electrical power from the master power converter to at least one of the at least one aileron actuator, the at least one flap actuator, the at least one slat actuator, the at least one landing gear actuator, the at least one thrust reverser actuator, the at least one brake actuator or the at least one taxiing actuator during a second mode of operation of the aircraft.

The first mode of operation may be cruise or high speed flight and the second mode of operation may be landing, take off or taxiing.

In the second mode of operation the controller may be arranged to allow the supply of electrical power sequentially from the master power converter to the at least one flap actuator and/or the at least one slat actuator, the at least one landing gear actuator, the at least one thrust reverser actuator, the at least one brake actuator and the at least one taxiing actuator.

In the second mode of operation the controller may be arranged to allow the supply of electrical power sequentially from the master power converter to the at least one taxiing actuator, the at least one brake actuator, the at least one flap actuator and/or the at least one slat actuator and the at least one landing gear actuator.

Generally, there may be a plurality of electrical actuators arranged in functional groups. Generally, the functional groups may be defined by potential use sequence or lack of likelihood of simultaneous demand or a similar electrical actuator demand requirement. The functional groups may be prioritised.

Generally, the electrical power distribution network may be coupled to electrical power generators having different electrical supply values. Generally, the electrical actuators may have individual and specific electrical power requirements achieved by reconfiguration of the master power converter. Typically the electrical actuators may be provided with electrical power in a sequence determined by the controller in the second mode of operation.

The at least one electrical actuator may be provided with electrical power by the master power converter for a fixed time period. The fixed time period may be one second.

An electrical actuator may be provided with a mechanical lock to retain position. The mechanical lock may be releasable by the controller.

An actuator may comprise an electrical motor. The electric motor may be a stepping motor and the master power converter provides electrical power for each step of the stepping motor.

The master power converter may comprise an AC to DC converter and a DC to AC converter.

Also in accordance with aspects of the present invention there is provided a method of operating an aircraft electrical actuator arrangement, the aircraft electrical actuator arrangement comprising a plurality of electrical actuators coupled to an electrical power distribution network, the electrical power distribution network having at least one master power converter to convert electrical power from the electrical power distribution network for supply to each electrical actuator, the electrical actuators comprising at least one environmental control system actuator, at least one aileron actuator, at least one flap actuator, at least one slat actuator, at least one landing gear actuator, at least one thrust reverser actuator, at least one brake actuator and at least one taxiing actuator, the method comprising supplying electrical power from the master power converter to the at least one environmental control system actuator during a first mode of operation of the aircraft and supplying electrical power from the master power converter to at least one of the at least one aileron actuator, the at least one flap actuator, the at least one slat actuator, the at least one landing gear actuator, the at least one thrust reverser actuator, the at least one brake actuator and the at least one taxiing actuator in a second mode of operation of the aircraft.

The first mode of operation may be cruise or high speed flight and the second mode of operation may be landing, take off or taxiing.

The second mode of operation may comprise supplying electrical power sequentially from the master power converter to the at least one flap actuator and/or the at least one slat actuator, the at least one landing gear actuator, the at least one thrust reverser actuator, the at least one brake actuator and the at least one taxiing actuator.

The second mode of operation may comprise supplying electrical power sequentially from the master power converter to the at least one taxiing actuator, the at least one brake actuator, the at least one flap actuator and/or the at least one slat actuator and the at least one landing gear actuator.

The method may comprise supplying electrical power from the master power converter to the electrical actuators in a sequence determined by a controller.

The method may comprise supplying electrical power from the master power converter to the electrical actuators for a fixed time period. The fixed time period may be one second.

Figure 2:
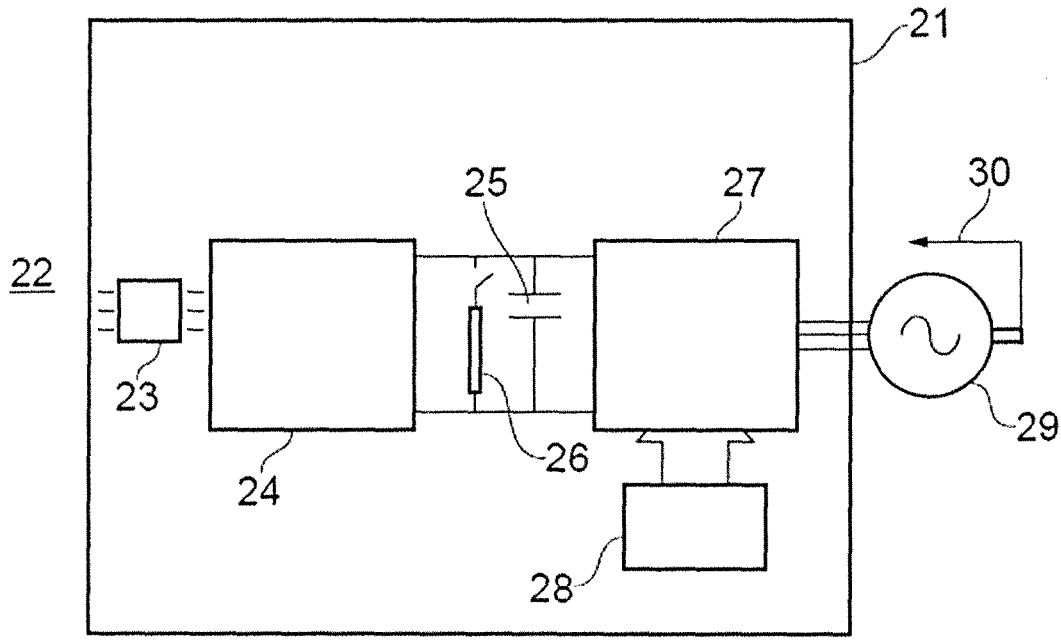

An embodiment of aspects of the present invention will now be described by way of example only with reference to the accompanying drawings in which:

FIG. 1 provides a schematic illustration of an electrical power converter in accordance with aspects of the present invention; and FIG. 2 provides a schematic illustration of a prior art converter and actuator.

Figure 3:
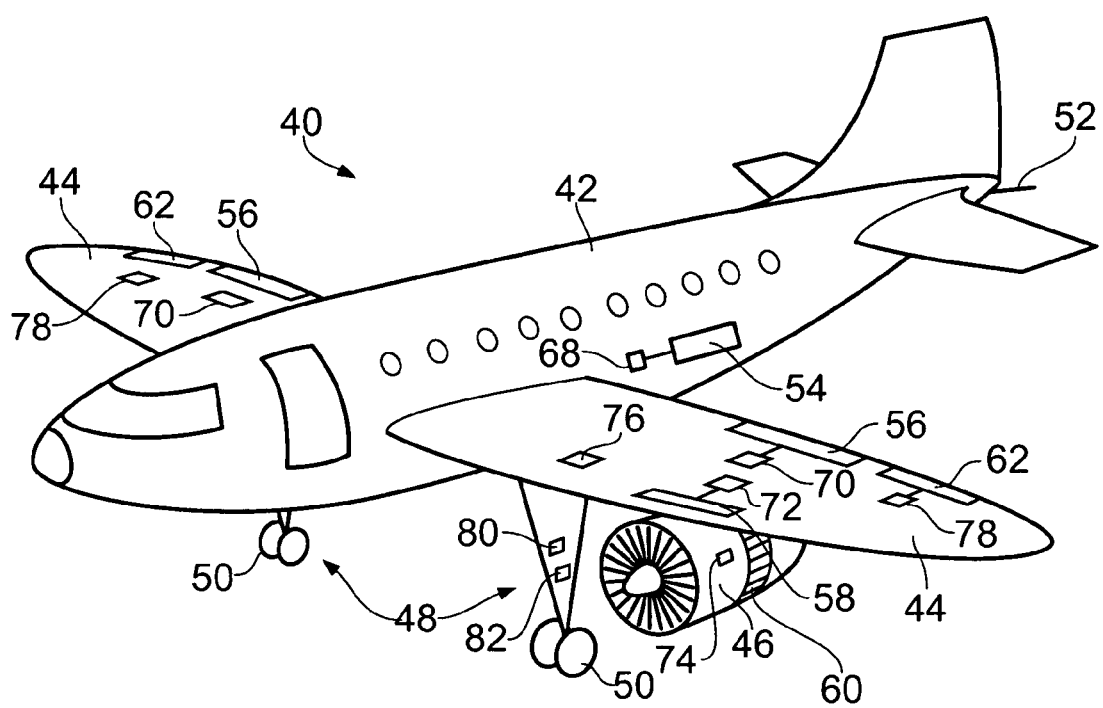

FIG. 3 provides a schematic perspective view of an aircraft with an electrical power converter in accordance with aspects of the present invention.

Aspects of the present invention address problems with regard to use of electrical actuators in such situations as aircraft. As indicated above generally such electrical actuators are provided on a power distribution network in which the network includes at least one generator. The generator will be in arrangement with a gas turbine engine to drive the generator in normal operation. The generator will provide electrical power to the network at a particular supply value whether that is current or voltage. In previous arrangements each electrical actuator had its own electrical power converter to take the electrical power on the power distribution network and adapt that power supply value to the particular electrical actuator's requirements. In accordance with aspects of the present invention a centralised master power converter and associated controller are arranged to intelligently switch the master power converter to provide the necessary variable loads within the power distribution network. In such circumstances, rather than a generic electrical power supply being provided to the power distribution network and each electrical actuator arranged on a decentralised basis to adjust that power supply for its own requirements, there is a central power conversion, by the master power converter, and each electrical actuator only takes electrical power when there is a demand requirement.

In large civil aircraft there will generally be a number of electrical generators. These electrical generators will normally be configured to supply separate power islands within the power distribution network. As more electric operation is provided the combined power requirements of all these power islands may be significant and possibly in the order of one megawatt. Furthermore, to provide greater flexibility through a variable frequency in the range 360 to 800 HZ means that many induction machines traditionally used to drive pumps and fans have been replaced by AC to AC frequency change circuits using power electronic conversion technologies. In such circumstances each electrical actuator in the form of a pump or fan will require its own converter from the power supply provided through the power distribution networks. Such an approach increases complexity in order simply to achieve the required speed ranges for each electrical actuator in terms of pumping or fans. It will be appreciated there are other electrical actuators utilised with regard to movement of flaps or other functions within an aircraft.

As described above one advantage with regard to providing more electrical operation within a gas turbine engine driven environment is that it is not necessary to bleed air from the gas turbine engine in order to provide environmental control systems for ventilation. Such environmental control system will now be achieved through appropriate electrical actuators and electrical power conversion. Such electrical power conversion will be relatively complex and will include a rectifier stage, (AC to DC), a DC link and an inverter stage (DC to AC). Furthermore the environmental control system will typically constitute a major proportion of electrical load and would generally be in the order of several hundred kW and typically spread over a number of power islands for security/availability and consistency reasons.

Although there are several electrical actuators within an aircraft power distribution network it will be appreciated that these electrical actuators will generally not be operable at the same time. For example an environmental control system may require to be operated at full capacity only at certain times in the aircraft flight cycle. In such circumstances the environmental control system may not be required to be operational at full capacity whilst the aircraft is landing or taking off. Such a reduction in requirements with regard to the environmental control system produces additional capacity within the power distribution network. However, with prior arrangement(s) that capacity has not been utilisable. Operation at reduced capacity means the high overheads in terms of space, complexity and cost of providing power electronic conversion for each electrical actuator of the environmental control system is not being utilised to best effect. In such circumstances aspects of the present invention relate to providing a master power converter and controller to operate electrical actuators selectively as required. A central master converter/controller will provide electrical power to the power distribution network and therefore the electrical actuators when those electrical actuators have a demand requirement. One or a limited number of master power converters/controllers will generally reduce weight and therefore provide efficiencies of operation. It will also be understood by providing such an approach fitting of further electrical components and electrical actuators can be more readily achieved by simply reconfiguring the master power converter and a controller to provide the desired power value for that controller in accordance with appropriate sequencing.

Aspects of the present invention depend upon a presumption that all electrical actuators will not be required to be operated at least fully at all times. Nevertheless, it will be appreciated that certain electrical actuators and systems associated with those electrical actuators may require simultaneous operation. In such circumstances electrical actuators may be divided into functional groups. These functional groups may be simply dependent upon an actual function such as environmental control system or flap orientation or alternatively may be divided into groups which are unlikely to require simultaneous operation.

Increasing use of variable frequency power supplies adds complication with regard to electrical equipment requirements and in particular electrical actuators in accordance with aspects of the present invention because power electronic rectifiers and inverter circuits will be more commonly required to meet basic performance for the electrical systems. Such requirements with traditional approaches will result in large size, weight and cost implications compared to traditional hydraulidpneumatic equivalents resulting in limited introduction of electrical actuators into a modern aircraft. It will also be understood that there are a wide range of equipment and applications which require actuation. For example advantageously there may be electric flight control actuation, electric thrust reversers, electric landing gear, electric braking etc. Some of these functions may be safety critical and therefore must have adequate electrical power supply at all times but may not be operable at all those times. Other systems may not be so safety critical but will require electrical power supply as required. The master power converter and controller in accordance with aspects of the present invention will at least be able to distinguish between functional groups for electrical actuators in terms of safety critical and essential equipment for flight control in an aircraft and more discretionary electrical actuator devices.

By utilisation of a centralised master power converter and controller to switch electrical power to the various electrical loads and in particular electrical actuators at appropriate times in a flight there will be achieved significant reductions in system weight and costs and therefore provide further stimulation to further electrification of operations within an aircraft.

FIG. 1 provides a schematic illustration of a master power converter and controller in accordance with aspects of the present invention. The master power converter is a power electronic converter. Initially a consideration will be made as to the electrical power conversion requirements for the various loads and in particular electrical actuators within a system. There will be temporary or pulse load requirements provided by the electrical equipment and electrical actuators. Aspects of the present invention avoid provision of distinct power converters directly associated with electrical actuators and instead provide a switched control of a master power converter. Such approaches as indicated will reduce costs, weight and size requirements. In FIG. 1 a master power converter 1 is provided along with an associated distribution switch 8. The master power converter 1 generally has an AC to DC module 3 and a DC to AC module 4. The master power converter 1 in such circumstances receives an electrical power supply 5 from a power generator or a number of power generators and appropriately converts that power supply to a DC power supply. The DC to AC module 4 takes the DC power supply and converts it to AC power supply. In such circumstances the DC to AC module 4 receives control signals 6, 7 from a controller function. Control signal 6 provides indications at least of electrical actuator or load demand from a particular electrical actuator or load within a power distribution network. In such circumstances the controller will monitor typically through an appropriate sensor, or a demand indicator, requirements and therefore configure the DC to AC module 4 appropriately to provide the necessary power supply level for that electrical actuator demand requirement. It will also be understood in order to adjust the power supply, or power supply value, generally feed back signals 7 will be provided to the DC to AC module 4 to adjust the power supply for the particular electrical actuator in the plurality of electrical actuators in accordance with aspects of the present invention.

The appropriately specified AC power supply for the electrical actuator demand requirement will be supplied generally to the distribution switch 8. The distribution switch 8 may operate either specifically dependent upon electrical actuator demand requirements or simply sequenced through all electrical actuator supply paths through the power distribution network as required. In such circumstances an electrical actuator select signal, or channel signal, 9 will couple the power supply from the DC to AC module 4 to the electrical actuators in accordance with aspects of the present invention. The distribution switch 8 will typically be an electro mechanical device or a solid state device giving current limit and circuit breaking capacity.

In a specific operation mode it will be appreciated that the electrical actuator select signal 9 will specifically connect the power supply from the DC to AC module 4 through a selector 10 to a particular supply path to electrical actuators 11 for modules or loads. Such an approach requires monitoring of electrical actuator 11 demand requirements and potentially prioritisation of electrical actuators 11 dependent upon the degree of essentiality of such electrical actuator 11 operation in use. Such an approach may require more sophisticated control algorithms than the simple sequencing process described below.

An alternative to specific coupling of particular power supply values from the DC to AC module 4 to match the requirements of individual electrical actuators 11 is simply to sequence through the power supply requirements for each electrical actuator 11 over a time period. In such circumstances each electrical actuator 11 will receive power for a fixed time period in each cycle and therefore all electrical actuators 11 through this time division have access to the power supply and will be able to operate accordingly. However, such an approach is contrary to the general considerations of aspects of the present invention in which it is known that certain electrical actuators 11 will not require power at certain phases of operation.

As an example of the sequence of operation of an electrical actuator 11 arrangement in accordance with aspects of the present invention, an outline below is given with regard to such operation during a landing phase for an aircraft.

FIG. 3 illustrates an aircraft 40, which is in a form generally conventional for a commercial airliner and the aircraft 40 comprises a fuselage 42, wings 44, gas turbine engines 46 and retractable landing gear 48 carrying wheels 50. An auxiliary power unit 52, which may be an additional gas turbine engine not used for propulsion, is indicated schematically at the tail of the fuselage 42, which is a conventional location for an auxiliary power unit (APU) 52. The auxiliary power unit 52 may be positioned elsewhere. The auxiliary power unit 52 provides auxiliary power for various systems, including systems which may be needed when the aircraft 40 is on the ground and the main gas turbine engines 46 are not operating. The aircraft 40 also has an environmental control system (ECS) 54, illustrated schematically in FIG. 3. FIG. 3 also shows flaps 56, slats 58, and ailerons 62 provided on the wings 44 of the aircrafts 40. The gas turbine engines 46 have thrust reversers 60. There are flap actuators 70, slat actuators 72, thrust reverser actuators 74, landing gear actuators 76, aileron actuators 78, braking actuators 80 and taxiing actuators 82. There is also an environmental control system actuator 68. These electrical actuators 68 to 82 are also shown in FIG. 1.

Initially, the aircraft 40 will be in a normal cruise and high altitude operation. In such circumstances generally the power distribution network will be configured to supply such systems as the environmental control system 54 as well as flight control mechanisms such as flaps 56, slats 58 and ailerons 62. It is known that the environmental control system 54 will require electrical power whilst other systems such as those with regard to deploying landing gear 48 or wheel 50 braking or otherwise are unlikely to require electrical power and therefore can be ignored.

At initiation of a landing phase it will be understood there is a reduction in altitude. In such circumstances such systems and therefore electrical actuators, e.g. environmental control system actuator 68, associated with such systems as the environmental control system 54 will require less power and therefore the master power converter 1 has more capacity and is released for other uses. In such circumstances an aircraft control computer will act through the distribution switch 8 and appropriate demand signals 6 to provide electrical power towards the flap actuators 70 and/or slat actuators 72. The electrical power input control and output power in such circumstances will be directed to drive the flaps 56 and/or the slats 58 to change wing geometry and such geometry will be indicated by appropriate feedback signals 7. Once the flaps 56 and/or slats 58 are in position these flight control surfaces will be locked in that position using an appropriate mechanical means such as a lock pin and the electrical power supply can be removed from the flap actuators 70 and/or slat actuators 72.

It will now be understood that the aircraft controller through its computer systems may order selection through the distribution switch 8 of the landing gear actuators 76. In such circumstances the master power converter 1 will then provide electrical power appropriate for actuation of the landing gear 48. With the landing gear 48 appropriately deployed again a feedback signal 7 will be provided such that once in position the landing gear 48 can be locked in position using mechanical means and the electrical power to that landing gear actuators 76 arrangement removed.

It will be understood that the aircraft controller may next order through an appropriate electrical actuator select signal 9 electrical power distribution to a thrust reverser actuator 74. Again the electrical actuator demand requirement will be provided through signals 6 such that the master power converter 1 and in particular through the DC to AC module 4 will provide the appropriate electrical power for the thrust reverser actuators 74 via the distribution switch 8. In such circumstances electrical power will be provided for actuation of the thrust reversers 60 until such thrust reversers 60 are in position and an appropriate feedback signal 7 given. Once in an appropriate position the thrust reversers 60 will be locked using an appropriate mechanical means and therefore power removed from the thrust reverser actuators 74.

Once on the ground, the aircraft controller will issue an electrical actuator select signal 9 for a braking mode. The brakes have their own form of electrical actuator and therefore electrical power supply as configured by the DC to AC module 4 will be provided. The distribution switch 8 will couple that electrical power to the braking actuators 80. The brakes will assist with regard to deceleration of the aircraft 40 and will provide an appropriate feedback signal 7 dependent upon requirements.

It will be understood that there may be fixed or variable relationships between the electrical actuators and certain electrical actuators may be operated more than once. Thus once on the ground the master power converter 1 may be reconfigured in order to provide electrical power, via the distribution switch 8, for the thrust reverser actuators 74 and therefore the electrical actuator select signal 9 provided to couple that electrical power through an appropriate supply pathway to the thrust reverser actuators 74. In such circumstances the thrust reversers 60 may be reconfigured or they may no longer be required and so retracted. Once retracted the thrust reversers 60 will again be locked in position by an appropriate mechanical means and the electrical power supply removed from the thrust reverser actuators 74.

It will be understood that once on the ground after appropriate braking the aircraft 40 will be at a relatively low speed. In such circumstances the aircraft controller may switch power to taxiing actuators 82 associated with taxi functions. These taxi functions may relate to provision of ventilator fans, power assistance with regard to access hatches and doors and operation of flaps for steering as well as actuators for turning landing gear 48. In such circumstances the electrical power can be utilised to drive wheels 50 for taxi operations and manipulation of the aircraft 40 towards a passenger terminal.

At initiation of take off phase the aircraft controller is arranged to allow the supply of electrical power from the master power converter 1 to the taxiing actuators 82 associated with taxiing functions. These taxi functions may relate to provision of ventilator fans, power assistance with regard to access hatches and doors and operation of flaps for steering as well as actuators for turning landing gear 48. In such circumstances the electrical power can be utilised to drive wheels 50 for taxi operations and manipulation of the aircraft 40 away from the passenger terminal and towards a runway for take off. The aircraft controller is arranged to allow the supply of electrical power from the master power converter 1 to the brake actuator 80 to brake the aircraft 40 before take off. The aircraft controller is arranged to allow the supply of electrical power from the master power converter 1 to the flap actuator 70 and/or the slat actuator 72 to change wing geometry appropriately for take off, and such geometry will be indicated by appropriate feedback signals 7. Once the aircraft 40 has taken off the aircraft controller is arranged to allow the supply of electrical power to the landing gear actuator 76 to retract the landing gear 48 into the aircraft 40. With the landing gear 48 appropriately retracted again a feedback signal 7 will be provided such that once in the retracted position the landing gear 48 can be locked in position using mechanical means and the electrical power to that landing gear actuators 76 arrangement removed. It will be understood that there may be fixed or variable relationships between the electrical actuators and again certain electrical actuators may be operated more than once.

By aspects of the present invention it will be appreciated that a master power converter and appropriate controller avoids the necessity for providing power electronic control within each electrical actuator or other electrical equipment in an aircraft. In such circumstances by providing a master power converter or a more limited number of master power converters compared to individual power converters for each electrical actuator with previous arrangement benefits are provided as indicated above. A particular benefit with utilisation of a network wide approach to power electronic conversion and drivers is the removal of individual electrical loads for each electrical actuator. With traditional approaches as indicated each electrical actuator would have electrical equipment to provide clean power rectification, DC link capacitors, regenerative dump circuits and resistors, inverter stages, control system processors, power supplies, heat sinks, EMC filters etc. FIG. 2 provides a schematic illustration of a typical prior actuator arrangement with these features. In accordance with aspects of the present invention it will be understood that those parts within box 21 are effectively removed to a master power converter and controller. In such circumstances the potential savings are significant in that the actual electrical equipment required at an electrical actuator is generally significantly reduced to an electric motor and appropriate feedback transducers for signalling position or status. Such an approach provides significant and attractive benefits and therefore will potentially provide great stimulus for utilisation of increasing numbers of electrical actuators within an aircraft.

As illustrated in FIG. 2 with a prior art local electrical actuator arrangement a power supply 22 will typically be initially filtered through an electromagnetic filter 23 then rectified by a rectifier 24 before presentation through appropriate limiter devices such as a capacitor 25 and a resistor 26 as a dump circuit. The rectifier electrical power will be presented to an inverter 27 and operation controlled by control features 28. These control elements within the box 21 in such circumstances will act to provide an electrical power supply to an electrical actuator in the form of an electric motor 29 which will actuate such devices as flaps or slats or otherwise. As indicated previously a sensor or other monitor is provided to give a feedback signal 30 for appropriate configuration of the arrangement. Although the control equipment defined in the box 21 will allow provision of a variable frequency supply necessitated by the electrical actuator 29 requirements as indicated provision of such control elements locally to the electrical actuator 29 is extravagant in terms of space complexity and cost. By aspects of the present invention the control elements defined in the box 21 are removed to a master power converter and controller which selectively and specifically provides electrical power suitable for the electrical actuator 29 when required.

It will be appreciated that it is important with regard to aspects of the present invention that an appropriate means for selection of the feed path to the electrical actuators is provided. Such selection may be through an electro mechanical circuit breaker system which would be present at each electrical actuator load. The circuit breaker in such circumstances switches in, or switches, out the electrical power supply dependent upon requirements. Traditional circuit breakers are utilised to isolate loads and in particular electrical actuators and other sources of fault. In such circumstances a circuit breaker can also act selectively, in accordance with aspects of the present invention, switch in or switch out electrical power supply. As an alternative to utilisation of electromechanical circuit breakers it will be understood that power electronic materials and devices which are based upon solid state equipment such as silicon carbide or similar technology may also be used. Such solid state circuit breakers may provide very fast methods of switching power between various loads and also offer current limiting, current interruption and fault detection facilities.

It will be appreciated that with regard to application of aspects of the present invention rapid switching and selective switching to provide appropriate electrical power values to particular electrical actuators as required in sequence is important. It will be understood that when necessary it is important that for example deployment of flaps, slats as well as thrust reversers and brakes must occur. In such circumstances controllers in accordance with aspects of the present invention configure the master power converter as well as the distribution switch with regard to distribution of that electrical power must be particularly robust and reliable. Aspects of the present invention provide particular advantages with regard to simplification where temporary or variable power electronic loads for electrical actuation are utilised. By limiting the power converters as necessary it will be understood that more acceptable usage of electrical actuators may be achieved. Aspects of the present invention generally provide weight, size and cost benefits in comparison with prior art electrical systems principally due to the centralised master power converter units in terms of controllers and power converters in comparison with individual power electronic components for electrical actuators with previous devices. The master power converters in accordance with aspects of the present invention will be multi functional. Such an approach removes the need for a distributed power electronic elements at the load junction, that is to say the electrical actuator locations within an aircraft.

It will be understood that intelligent load management and switching is possible through an appropriate controller providing individual selected distribution path or channel routing to electrical actuator hardware and flight control elements. It will be understood that flight control computers will generally indicate demand requirements to the master power converters and switching and therefore an appropriate power supply provided to the electrical actuator when needed. Generally the selection processing will be through solid state switching as this offers additional protection and health monitoring opportunities with regard to the status of arrangements in accordance with aspects of the present invention.

Aspects of the present invention are particularly applicable to loads in the form of electrical actuators which are temporarily energised during take off and landing phases with regard to an aircraft. It may also be possible to divert electrical power from dominant loads during other phases of flight. For example this may be particularly relevant to temporary short term loads such as electrical actuators which operates flight control services and which will generally be required to be operated on an infrequent basis for less than one second at a time. It may be possible to design controllers which provide "a ride through" capability when a dominant or priority load requires electrical power in order to temporarily divert electrical power from less important or transient loads as and when required. Such transient loads may include discretionary features such as environmental controls or galley kitchen equipment.

By use of a distribution switch to provide a path or a electrical actuator select signal it will be understood that the arrangement may be arranged to provide electrical power to one or more electrical actuators or other loads at a time if these electrical actuators or loads are supplied with the same frequency and power supply value. Such an approach provides additional functionality with regard to a centralised master power converter in accordance with aspects of the present invention. Thus the master power converter and associated distribution switch can produce a constant frequency supply feed for several loads as required and distributed through a power distribution network. The distribution switch in such circumstances can be configured to isolate the supply and circulate power between loads as may be required to deal with loads producing high levels of regenerative power.

It will be understood that the master power converter in accordance with aspects of the present invention may be utilised in an electrical power distribution network where there are a number of different electrical power loads. Thus aspects of the present invention have particular applicability with regard to aerospace, maritime electrical distribution networks and land based electrical distribution networks including those associated with automobiles.

The present invention, as mentioned above, may be used in maritime electrical distribution networks. In the case of a maritime electrical distribution network a ship control computer will act through the distribution switch 8 and appropriate demand signals 6 to provide electrical power towards various electrical actuators on the ship at initiation of a docking phase. The ship control computer will act through the distribution switch 8 to select stabiliser actuators to move the ship stabiliser, or stabilisers, from a deployed position, used during cruise to stabilise the ship, to a non-deployed position to allow the ship dock. When the stabilisers are in the non-deployed position the stabilisers are locked in position using mechanical means and the electrical power to the stabiliser actuators is removed. The stabilisers are also locked in the deployed position using mechanical means during cruise. The ship control computer may next act through the distribution switch 8 to select thruster actuator, or thruster actuators, to provide power to the thruster, or thrusters, and/or to move the thruster, or thrusters, to control the amount of thrust and the direction of thrust provided by the thruster, or thrusters, during docking of the ship. The thrusters may be rim driven electrical thrusters and the thrusters may be provided at the bow and stern of the ship. The ship control computer may act through the distribution switch 8 to select the environmental control system actuators to provide power to the environmental control system within the ship during cruise. The ship control computer may act through the distribution switch 8 to select electrical propulsion actuators to provide power to the electrical propulsion of the ship during cruise. The electrical propulsion may be a propeller or a water jet etc.

A ship electrical actuator arrangement comprising a plurality of electrical actuators coupled to an electrical power distribution network, the electrical power distribution network having at least one master power converter to convert electrical power from the electrical power distribution network for supply to each electrical actuator, the electrical actuators comprising at least one environmental control system actuator, at least one propulsion actuator, at least one stabiliser actuator and at least one thruster actuator, a controller being coupled to the master power converter coupled, the controller being arranged to allow the supply of electrical power from the master power converter to the at least one environmental control system actuator and/or the at least one propulsion actuator during a first mode of operation of the ship, the controller being arranged to allow the supply of electrical power from the master power converter to at least one of the at least one thruster actuator or the at least one stabiliser actuator during a second mode of operation of the aircraft.

Modifications and alterations to aspects of the present invention will be appreciated by persons skilled in the technology. Thus the provision of a master power converter for a number of loads and electrical actuators which do require continuous power supply can benefit from provision in an arrangement in accordance with aspects of the present invention. Generally the master power converter and controller as indicated above will provide an over monitor with regard to ensuring that loads and electrical actuators of different priority receive electrical power in accordance with that priority when limited supply is available. The controller may effectively time division distribute the electrical power sequentially through the loads evenly or disproportionately dependent upon particular requirements. Grouping of electrical actuators and loads dependent upon function or priority will enable the controller to ensure loads and electrical actuators which have the same requirement in terms of frequency and power supply value can all be supplied at the same time effectively or as time requires electrical power supply only to high priority or in extreme circumstances essential loads within the system and distribution network.

The invention claimed is:

1. An aircraft electrical actuator arrangement comprising a plurality of electrical actuators coupled to an electrical power distribution network, the electrical power distribution network having at least one master power converter to convert electrical power from the electrical power distribution network for supply to each electrical actuator, the electrical actuators comprising at least one environmental control system actuator, at least one aileron actuator, at least one flap actuator, at least one slat actuator, at least one landing gear actuator, at least one thrust reverser actuator, at least one brake actuator and at least one taxiing actuator, a controller being coupled to the master power converter coupled, the controller being arranged to allow the supply of electrical power from the master power converter to the at least one environmental control system actuator during a first mode of operation of the aircraft, the controller being arranged to allow the supply of electrical power from the master power converter to at least one of the at least one aileron actuator, the at least one flap actuator, the at least one slat actuator, the at least one landing gear actuator, the at least one thrust reverser actuator, the at least one brake actuator or the at least one taxiing actuator during a second mode of operation of the aircraft.

2. An aircraft electrical actuator arrangement as claimed in claim 1 wherein the first mode of operation is cruise or high speed flight and the second mode of operation is landing, take off or taxiing.

3. An aircraft electrical actuator arrangement as claimed in claim 1 wherein in the second mode of operation the controller being arranged to allow the supply of electrical power sequentially from the master power converter to the at least one flap actuator and/or the at least one slat actuator, the at least one landing gear actuator, the at least one thrust reverser actuator, the at least one brake actuator and the at least one taxiing actuator.

4. An aircraft electrical actuator arrangement as claimed in claim 1 wherein in the second mode of operation the controller being arranged to allow the supply of electrical power sequentially from the master power converter to the at least one taxiing actuator, the at least one brake actuator, the at least one flap actuator and/or the at least one slat actuator and the at least one landing gear actuator.

5. An aircraft electrical actuator arrangement as claimed in claim 1 wherein there is a plurality of electrical actuators arranged in functional groups.

6. An aircraft electrical actuator arrangement as claimed in claim 5 wherein the functional groups are defined by potential use sequence or lack of likelihood of simultaneous demand or a similar electrical actuator demand requirement.

7. An aircraft electrical actuator arrangement as claimed in claim 6 wherein the functional groups can be prioritised.

8. An aircraft electrical actuator arrangement as claimed in claim 1 wherein the electrical power distribution network is coupled to electrical power generators having different electrical supply values.

9. An aircraft electrical actuator arrangement as claimed in claim 1 wherein the electrical actuators have individual and specific electrical power requirements achieved by reconfiguration of the master power converter.

10. An aircraft electrical actuator arrangement as claimed in claim 1 wherein the electrical actuators are provided with electrical power in a sequence determined by the controller in the second mode of operation.

11. An aircraft electrical actuator arrangement as claimed in claim 1 wherein the at least one electrical actuator is provided with electrical power by the master power converter for a fixed time period.

12. An aircraft electrical actuator arrangement as claimed in claim 11 wherein the fixed time period is one second.

13. An aircraft electrical actuator arrangement as claimed in claim 1 wherein an electrical actuator is provided with a mechanical lock to retain position.

14. An aircraft electrical actuator arrangement as claimed in 13 wherein the mechanical lock is releasable by the controller.

15. An aircraft electrical actuator arrangement as claimed in claim 1 wherein an actuator comprises an electrical motor.

16. An aircraft electrical actuator arrangement as claimed in claim 15 wherein the electric motor is a stepping motor and the master power converter provides electrical power for each step of the stepping motor.

17. An aircraft electrical actuator arrangement as claimed in claim 1 wherein the master power converter comprises an AC to DC converter and a DC to AC converter.

18. An aircraft electrical actuator arrangement as claimed in claim 1, wherein the actuator arrangement does not include an individual controller unit for each electrical actuator.

19. A method of operating an aircraft electrical actuator arrangement, the aircraft electrical actuator arrangement comprising a plurality of electrical actuators coupled to an electrical power distribution network, the electrical power distribution network having at least one master power converter to convert electrical power from the electrical power distribution network for supply to each electrical actuator, the electrical actuators comprising at least one environmental control system actuator, at least one aileron actuator, at least one flap actuator, at least one slat actuator, at least one landing gear actuator, at least one thrust reverser actuator, at least one brake actuator and at least one taxiing actuator, the method comprising supplying electrical power from the master power converter to the at least one environmental control system actuator during a first mode of operation of the aircraft and supplying electrical power from the master power converter to at least one of the at least one aileron actuator, the at least one flap actuator, the at least one slat actuator, the at least one landing gear actuator, the at least one thrust reverser actuator, the at least one brake actuator and the at least one taxiing actuator in a second mode of operation of the aircraft.

20. A method as claimed in claim 19 wherein the first mode of operation is cruise or high speed flight and the second mode of operation is landing, take off or taxiing.

21. A method as claimed in claim 19 wherein the second mode of operation comprises supplying electrical power sequentially from the master power converter to the at least one flap actuator and/or the at least one slat actuator, the at least one landing gear actuator, the at least one thrust reverser actuator, the at least one brake actuator and the at least one taxiing actuator.

22. A method as claimed in claim 19 wherein the second mode of operation comprises supplying electrical power sequentially from the master power converter to the at least one taxiing actuator, the at least one brake actuator, the at least one flap actuator and/or the at least one slat actuator and the at least one landing gear actuator.

23. A method as claimed in claim 19 comprising supplying electrical power from the master power converter to the electrical actuators in a sequence determined by a controller.

24. A method as claimed in claim 19, wherein the actuator arrangement does not include an individual controller unit for each electrical actuator.

25. A method as claimed in claim 19 comprising supplying electrical power from the master power converter to the electrical actuators for a fixed time period.

26. A method as claimed in claim 25 wherein the fixed time period is one second.

* * * * *